(No Model.)
G. LUNDGREN.
HAND SLED.
No. 404,975. Patented June 11, 1889.
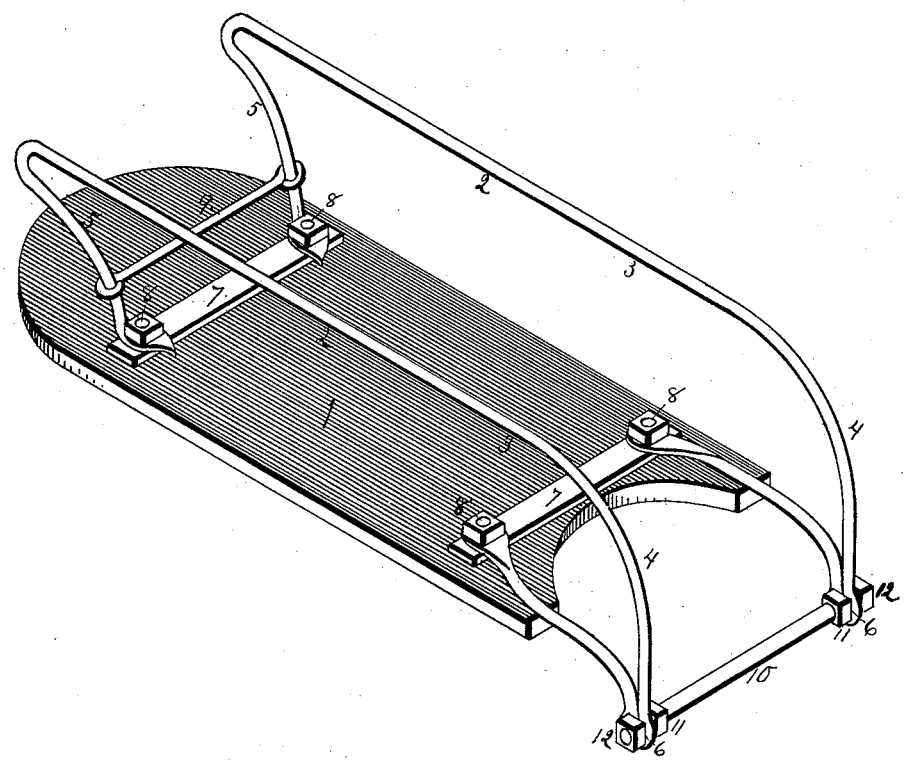
Witnesses:
E. Behel.
W. A. Wilson
Inventor:
Gustaf Lundgren
By J & A O Behel
Attys.

UNITED STATES PATENT OFFICE.

GUSTAF LUNDGREN, OF ROCKFORD, ILLINOIS.

HAND-SLED.

SPECIFICATION forming part of Letters Patent No. 404,975, dated June 11, 1889.

Application filed October 10, 1888. Serial No. 287,718. (No model.)

*To all whom it may concern:*

Be it known that I, GUSTAF LUNDGREN, a citizen of the United States, residing at Rockford, in the county of Winnebago and State of Illinois, have invented certain new and useful Improvements in Hand-Sleds, of which the following is a specification.

The object of this invention is to construct a light and efficient sled of few pieces.

In the accompanying drawing is represented a hand-sled embodying my invention, showing its under side.

The sled-bottom 1 is composed preferably of hard wood in the form shown. To the under side of the bottom are secured two runners 2. Each runner is composed of a single piece of round steel, forming the runner proper 3, front knee 4, and rear knee 5. The front knee is curved and extends upward above the top of the sled-bottom, forming the eye 6, from which it descends in the form shown and passes under the bottom. The rear knee 5 is curved and rises nearly vertical to the under side of the sled-bottom. The free ends of the runners are perforated. To the under side of the sled-bottom are placed transverse supports 7. Bolts or rivets 8 pass through the free ends of the runner and supports 7 and connect them to the sled-bottom. A rear transverse brace 9 connects the rear knees of the runners together between the base of the runner and their connection with the sled-bottom. This brace is very important, as it imparts strength to the runners and prevents their spreading, which is likely to occur in this class of sleds constructed without vertical braces connecting the runner with the sled-bottom. A forward transverse brace 10 connects the upper forward ends of the runners. This brace has both its ends screw-threaded. Nuts 11 are screwed on the ends of the brace. The brace is then placed in position by projecting through the eyes 6, and by means of the screw-nuts 12 the runners are clamped and held firmly between the nuts. By this construction of a hand-sled and the omission of the vertical braces connecting the runners with the sled-bottom I obtain the spring of the metal, which adds to the endurance and makes an easy-riding sled.

I claim as my invention—

1. In combination, a sled-bottom, transverse bottom supports on the under side of the sled-bottom, two runners connected to the sled-bottom by bolts or rivets passing through the runners and bottom supports, each runner composed of a single piece of metal forming the runner and its knee supports, and a transverse brace connecting the rear knees of the two runners, substantially as set forth.

2. In combination, a sled-bottom, runners secured to said bottom, the forward upward ends of said runners being bent to form eyes, a brace having screw-threaded ends inserted through said eyes, and nuts for engaging said screw-threaded ends, substantially as set forth.

3. In combination, a sled-bottom, transverse supports secured to the bottom thereof, two runners, each of which is composed of a single piece of metal forming the runner proper and its knee-supports, the forward knee-support constructed to form an eye and terminating in an inwardly-curved arm, the end of said arm and the end of said knee being secured to the transverse supports, braces for connecting the rear knees and the forward knees, the brace connecting the forward knees passing through the said eyes of the forward knees, and nuts for engaging the end of said brace, substantially as set forth.

GUSTAF LUNDGREN.

Witnesses:
A. O. BEHEL,
E. BEHEL.